Sept. 26, 1967 C. H. VAN HARTESVELDT ETAL 3,343,480

BELT DRIVE MECHANISM

Filed March 26, 1966

INVENTORS
CARROLL H. VAN HARTESVELDT
BUDDY D. WAHL

BY *Olsen and Stephenson*
ATTORNEYS

Sept. 26, 1967 C. H. VAN HARTESVELDT ETAL 3,343,480
BELT DRIVE MECHANISM

Filed March 26, 1966 2 Sheets-Sheet 2

INVENTORS
CARROLL H. VAN HARTESVELDT
BUDDY D. WAHL

BY *Olsen and Stephenson*
ATTORNEYS

United States Patent Office 3,343,480
Patented Sept. 26, 1967

3,343,480
BELT DRIVE MECHANISM
Carroll H. Van Hartesveldt, Toledo, Ohio, and Buddy D. Wahl, Ann Arbor, Mich., assignors to Hoover Ball and Bearing Company, Ann Arbor, Mich., a corporation of Michigan
Filed Mar. 26, 1965, Ser. No. 443,147
10 Claims. (Cl. 100—93)

ABSTRACT OF THE DISCLOSURE

Apparatus for continuously removing lubricants from one side of an endless sheet metal belt which is driven by drive rolls which frictionally engage the side of the belt from which lubricants are removed. A first scraper is positioned to remove lubricant from the belt, followed by an applicator for applying a diluent to the scraped surface, after which a second scraper removes diluted lubricant from the surface.

---

The present invention relates to improvements in a continuous press for forming flat workpieces. Apparatus of this general character is disclosed in United States Patent No. 3,159,526 and in pending United States application, Ser. No. 274,602, filed April 22, 1963, now Patent No. 3,206,009.

In apparatus of the type disclosed in the above patents, a pair of endless sheet metal belts are arranged so that workpieces can be sandwiched in between the belts and can be pulled between two opposed and inwardly facing shoes or platens which apply pressure and heat to the workpieces. The endless traveling belts slide over the platen surfaces so that the workpieces arranged between the belts are compressed between the platens. A roll assembly, which includes a drive roll, is mounted on the main frame of the machine for supporting each of the belts for travel along an endless path. By virtue of the fact that the platens are normally designed so that the workpieces are compressed, large driving forces must in many instances be applied by the roll assemblies to the belts in order to move the workpieces through the restricted area between the platens. Therefore, in order to obtain the most efficient operation, it is important that the belts move across the platen surfaces with a minimum of frictional resistance, and that the drive rolls drivingly engage the belts in a manner to provide the desired pulling forces on the belts. Thus, from the standpoint of realizing the maximum pulling forces on a single belt, the optimum conditions would prevail if there were no friction between the belt and its platen and if there were no slippage between the drive roll and the belt. However, it has been discovered that when approaching optimum conditions of this nature the best results desired are not necessarily produced, because when no slippage occurs at the drive roll, it is possible that one of the two belts will become the dominant one and will assume the entire load and the other belt will merely act as an idler belt. Thus, optimum results are realized when a controlled but small amount of slippage can occur at the drive roll to effect equalization of the loads on the belts, and in addition when such slippage is restricted to the extent that large driving forces can be applied to both belts by their associated drive rolls. In such an arrangement when the loads applied to the two belts are equalized, excessive strains in one of the belts, and excessive wear of one of the roll assemblies and its bearings is avoided.

It is an object of the present invention to provide improvements in a continuous press of the foregoing character wherein maximum effective belt pull is provided to the belts by means of the drive roll assembly, and also wherein the apparatus is constructed and arranged so that the load required to pull workpieces between the platens is equally distributed between the belts.

According to the present invention, there is provided a machine for forming workpieces in board or sheet form which has first and second shoes or platens having opposed compression surfaces in spaced apart relation, and first and second sheets or belts of thin flexible metal having a high tensile strength positioned to move over the surfaces respectively of the first and second shoes or platens, drive roll means for pulling said sheets or belts across the surfaces of said shoes or platens with a workpiece sandwiched between said sheets or belts, means for applying a lubricant to said sheets or belts and their respective shoes or platens, and means intermediate said shoes or platens and said drive roll means for removing lubricant in controlled amounts from said sheets or belts.

Further objects and advantages of this invention will become apparent from a consideration of the following description, the appended claims and the accompanying drawing in which:

Before explaining the present invention in detail, it is to be understood that the invention is capable of other embodiments and of being practiced or carried out in various ways. It is also to be understood that the phraseology or terminology employed herein is for the purpose of description and not of limitation.

Figure 1:
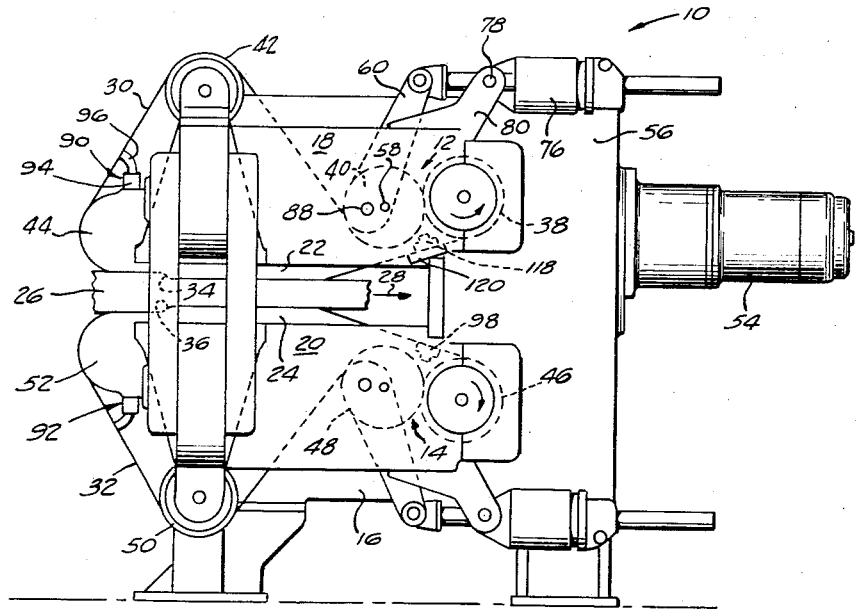
FIGURE 1 is a side elevational view of a machine embodying the present invention.
Figure 2:
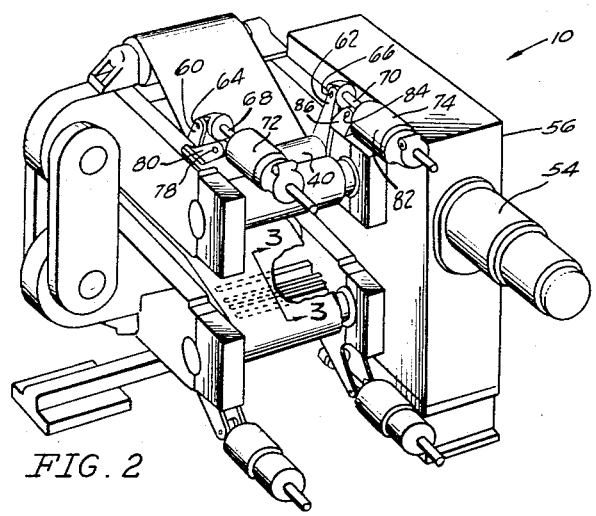
FIGURE 2 is a perceptive view of the machine shown in FIG. 1.

Referring to the drawings, the invention will now be described in greater detail. Referring first to FIGS. 1 and 2, a machine 10 is illustrated having a pair of roll assemblies 12 and 14 mounted on the main frame 16. The main frame 16 has upper and lower portions 18 and 20, respectively, between which are mounted opposed shoes or platens 22 and 24. A workpiece, indicated generally at 26, is shown being passed between the shoes 22 and 24 in the direction of the arrow 28 so that the workpiece has its outside surfaces compressed and finished in a manner described, by way of example, in the above cited U.S. Patent No. 3,159,526. A pair of sheet metal belts 30 and 32 are mounted on the roll assemblies 12 and 14, respectively, so that they are drawn over the shoes 22 and 24 for moving the workpiece 26, which is sandwiched therebetween, in the direction of the arrow 28. The shoes 22 and 24 are formed with steps 34 and 36, respectively, which are inclined inwardly toward each other so as to reduce the distance between the shoes 22 and 24 as the workpiece 26 is pulled therebetween. As a result, surface portions of the workpiece 26 are compressed and the driving forces required of the belts 30 and 32 to move the workpiece 26 are substantial.

The upper roll assembly 12 includes a drive roll 38 and a combined pinch and belt adjustment roll 40, hereinafter referred to as a "pinch roll," and an idler roll 42. The belt 30 is also trained over a bull nose section 44 positioned at the front of the platen 22. The lower roll assembly 14 likewise includes a drive roll 46, a combination pinch and belt adjustment roll 48, hereinafter also referred to as a "pinch roll," and an idler roll 50. The lower belt 32 is also trained over a bull nose section 52 positioned at the front end of the platen 24. A motor 54 is mounted on the main frame 16 so that it drives a drive gear assembly (not shown) disposed in a gear box 56 and connected to the drive rolls 38 and 46 so as to drive them in synchronized relationship in the direction of the indicated arrows shown in FIG. 1.

The upper pinch roll 40 is mounted at its ends on stub shafts 58, only one of which is shown, carried by a pair of adjusting arms 60 and 62 which are supported on their upper ends by pivot pins 64 and 66 which are carried by the piston rods 68 and 70. The piston rods 68 and 70 are a part of a pair of fluid operated assemblies 72 and 74, respectively. The cylinder assembly 72 has its cylinder 76 pivotally supported on a pivot pin 78 carried by a bracket 80 secured to the upper main frame portion 18. The cylinder 82 in the cylinder assembly 74 is supported on a pivot pin 84 which is substantially coaxial with the pin 78 and is carried by a bracket 86 mounted on the upper main frame portion 18 at a position in substantial alignment with the bracket 80. Adjacent its lower end, the arm 60 is pivotally connected to the main frame portion 18 by a pivot member 88, and the arm 62 is similarly connected to the main frame 18 by a pivot that is substantially coaxial with pivot 88 and which does not appear in the drawing.

As best seen in FIG. 1, the roll assembly 14 is essentially an upside down version of the assembly 12, and the pinch roll 48 in the assembly 14 operates and is adjusted in essentially the same manner as is the pinch roll 40 in the upper assembly 12. Thus, a detailed description of the roll assembly 14 will not be given, it being understood that it is essentially the same as the roll assembly 12. For a more detailed description of both of the roll assemblies 12 and 14 and the manner in which they operate, reference is made to the previously cited pending application Ser. No. 274,602, now Patent No. 3,206,009.

As is described in greater detail in the copending application, in the use of the roll assemblies 12 and 14, the belts 30 and 32 are aligned and the tensions therein are adjusted to obtain the desired tightness and alignments of the belts by means of the pinch rolls 40 and 48 and their associated assemblies 72 and 74.

As can be readily understood, the magnitude of the pull of the belts 30 and 32 is a function of the coefficient of friction between the drive rolls 38 and 40 and their respective belts 30 and 32. Normally, the drive rolls 38 and 40 are formed of a hard rubber material or of other suitable material having a high friction characteristic.

In order to obtain the maximum pulling effect of the belts 30 and 32 on the workpiece 28, it is necessary not only that there be material on the rolls 38 and 46 which has a high coefficient of friction but also that the belts 30 and 32 be relatively free of lubricants. It is also important that minimum frictional resistance occur between the belts 30 and 32 and their respective shoes or platens 22 and 24. For this purpose, a grid bearing sheet (not shown) has been provided for each of these platen surfaces, and for a more detailed description of these grid bearing sheets, reference is made to our copending application Ser. No. 314,068, filed Oct. 4, 1963, and now abandoned. In a further effort to reduce frictional resistance between the belts 30 and 32 and their respective platens 22 and 24, lubricating means 90 and 92 are provided, each comprising a container 94 and a felt wick 96. Normally, the container 94 will be filled with a rather viscous lubricant, such as an oil having a viscosity of 5000 Saybolt seconds at 100° F. and 250 Saybolt seconds at 210° F., and the wicks 96 will be arranged so as to wipe across the surfaces of the belts 30 and 32 which bear against their associated platens. Thus, a lubricant will be introduced between the adjacent bearing surfaces of the belts 30 and 32 and their respective bearing surfaces of the platens 22 and 24.

The use of the lubricant means 90 and 92 functions to provide minimum frictional resistance between the belts 30 and 32 and their respective platens 22 and 24. However, as indicated above, it is found that the presence of the lubricant on the belts 30 and 32 then has the harmful effect of lubricating the drive rolls 38 and 46 so as to reduce the desired high coefficient of friction of the surfaces of these drive rolls as applied to belts 30 and 32. This in turn materially reduces the effective pulling action of the belts 30 and 32 so as to reduce the rate of moving of the workpiece 26 through the machine, and also restricts the depth of surface compression that can be performed on a given workpiece of a given hardness of material.

Figure 3:
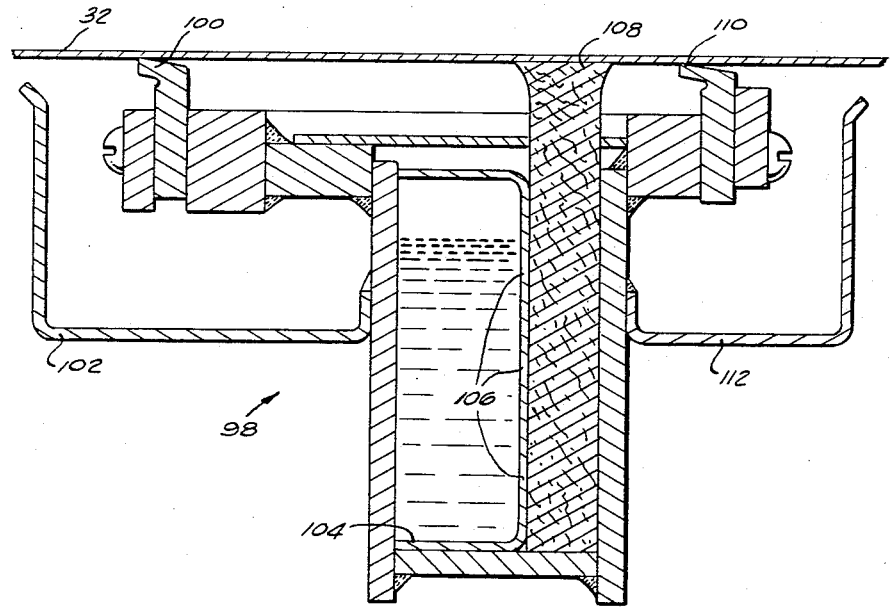
FIGURE 3 is an enlarged fragmentary sectional view taken on the line 3—3 of FIG. 2 showing an embodiment of a structure for aiding in increasing the belt pulling characteristics of the machine.
Figure 4:
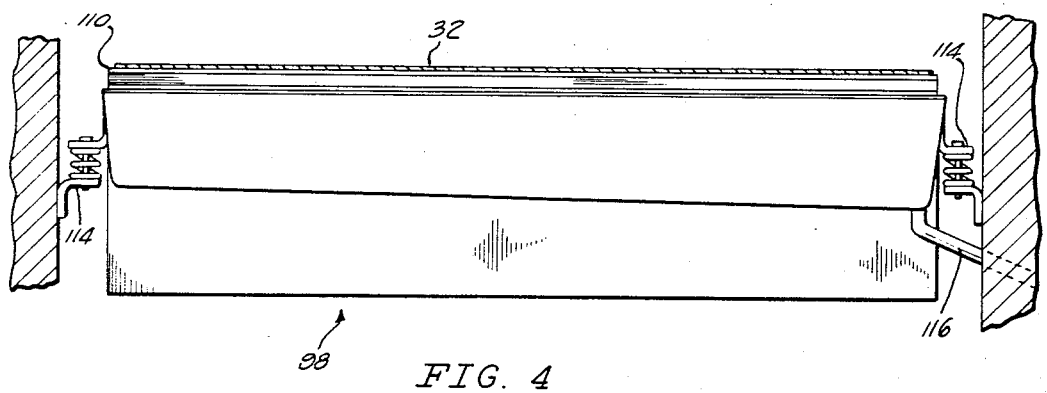
FIGURE 4 is a fragmentary sectional view as viewed from the right of FIG. 3 showing the manner of mounting the structure on the frame of the machine.

Referring now to FIGS. 3 and 4, attention is directed to apparatus which has been developed to eliminate the problem which occurs from lubrication of the platen bearing surfaces of the belts 30 and 32. As shown with respect to the belt 32, the device 98, which has been developed to increase the effective belt pull, comprises a first scraper 100 which is adapted to extend transversely the full width of the belt 32 and to engage the platen bearing surface thereof so as to scrape therefrom a substantial portion of the lubricant that was previously applied thereto by means of wick applicator 96. The lubricant so removed can be collected by the receptacle 102 which may also be constructed to extend transversely the full width of the belt 32. The device 98 contains a compartment 104 which is adapted to contain a hydrocarbon naphtha of extremely low viscosity, such as one having a flash point of 100° F. and having no non-volatile residue upon evaporation. Adjacent to the compartment 104 and in communication therewith by means of a plurality of ports 106 is a naphtha applicator 108, which can be formed of suitable material such as felt, which is in engagement with the platen bearing surface of the belt 32 so as to dilute substantially any of the thin layer of viscous lubricating oil that still remains on this surface.

In sequence, after the naphtha applicator 108 is positioned a second scraper 110 which also extends transversely of the belt 32 and is also adapted to scrape the platen bearing surface of the belt 32. Positioned adjacent to the second scraper 110 is a receptacle 112 which serves to collect diluted lubricant which is removed by the second scraper 110.

Referring to FIG. 4, an end elevation of device 98 can be seen, and as there shown, spring means 114 are utilized to urge the device into engagement with the belt 32. Conduits 116, only one of which is shown, are used to remove the materials collected into receptacles 102 and 112.

By virtue of the device 98, a means is provided to remove viscous lubricant that has been applied by the applicator 92, but it will be observed that the belt 32 will not be wiped entirely clean of all lubricant. The first scraper 100 will leave a thin film of the viscous lubricant on the surface of the belt 32 because of the inherent properties of such lubricants. Thereafter, the naphtha applicator 108 will serve to reduce substantially the viscosity of the film of lubricant that remained on the belt 32, and then the scraper 110 will serve to wipe the majority of the thinned lubricant from the belt. However, it is to be understood that a very thin film of lubricant reduced to a low viscosity will adhere to the surface of the belt so that a limited amount of slippage can occur between the drive roll and the belt 32. By virtue of this limited amount of slippage, protection is afforded against one of the belts becoming the dominant belt with all of the pull on the workpiece 26 being exerted by this belt while the other belt merely continues to move as an idler belt. In this manner assurance is provided that the loads will be equally distributed on the two belts.

When the amount of lubricant on the belt 32 is small and constant, such as when running with product at full platen width and uninterrupted in feed, the first scraper 100, is not necessary, and in this case satisfactory results can be obtained merely by use of the applicator 108 and scraper 110.

As indicated above, a hydrocarbon naphtha of low viscosity, such as one having a flash point of 100° F. and with no non-volatile residue upon evaporation has been found to be very suitable for use with the present invention. It is found that a solvent having these properties will be relatively volatile and this is desirable so that the diluted lubricant remaining on the belt will substantially evaporate before returning to the belt lubricating means 90 and 92 and also so that the diluted lubricant picked up by the drive roll will also evaporate. When a solvent such as is described above was used at a location approximately one and one-half feet in front of the belt drive roll it was found to operate satisfactorily to prevent one drive roll from becoming the dominant roll, and it was found that it had evaporated substantially completely before reaching the lubrication station, which represented approximately ten feet of belt travel. These results were derived when operating a belt having rate of travel up to thirty feet per minute. It was also found that a belt pull was realized which was several times greater than could be realized previously without the use of the lubricant remover.

The device 98 is shown supported beneath the belt 32 intermediate the platen 24 and the drive roll 46. A similar device 118 is positioned intermediate platen 22 and drive roll 38. The device 118 is spring urged against the belt 30 in substantially the same manner as the device 98 is spring urged against the belt 32. However, it is necessary to have a collection trough 120 below the device 118 to collect the materials that are scraped from the belt 30, and these materials can be drained to a bottom sump, not shown, in the same manner that the materials in the receptacles 100 and 102 are collected.

The embodiments of the invention in which an exclusive property or privilege is claimed are defined as follows:

1. In a machine for forming workpieces in sheet form, first and second shoes having opposed surfaces in spaced apart relation, first and second sheets of thin flexible metal having a high tensile strength positioned to move over the surfaces respectively of said first and second shoes, drive roll means for pulling said sheets across the surfaces of said shoes with a workpiece sandwiched in between said sheets, means for applying a lubricant between said sheets and their respective shoes, and means intermediate said shoes and said drive roll means for removing lubricant from said sheets, each of said last-named means comprising an applicator for applying a diluent to the surface of its associated sheet and a scraper arranged to scrape diluted lubricant from the surface of the sheet.

2. In a machine for forming workpieces in sheet form, first and second shoes having opposed surfaces in spaced apart relation, first and second endless loops of thin flexible sheet metal having a high tensile strength positioned to move over the respective surfaces of said first and second shoes, drive roll means for driving each of said loops so that a workpiece can be drawn between said shoes by frictional engagement with the surfaces of said loops, the drive roll of each of said means drivingly engaging the same surface of its associated loop that bears against the surface of the associated shoe, means to lubricate the shoe bearing surface of each loop prior to moving the same over the shoe surface, and means to remove lubricant from each loop after the latter has moved past the shoe surface and prior to engagement of such loop by the drive roll, each of said last-named means including a first scraper arranged to scrape lubricant from its loop, an applicator for applying a diluent to the scraped surface and a second scraper arranged to scrape diluted lubricant from the surface.

3. In a machine for forming workpieces in sheet form, a frame, first and second shoes mounted on said frame in parallel spaced apart relation to define therebetween a passageway having inlet and outlet ends, said shoes facing each other and each having a first flat surface adjacent to said inlet end, a parallel second flat surface adjacent to said outlet end and a compression surface sloping inwardly from said first to said second surface, first and second endless loops of thin flexible sheet metal having a high tensile strength supported on said frame to move over the respective surfaces of said first and second shoes, drive roll means for driving each of said loops so that a workpiece can be drawn between said shoe by frictional engagement with the surfaces of said loops, the drive roll of each of said means drivingly engaging the same surface of its associated loop that bears against the surface of the associated shoe, means to lubricate the shoe bearing surface of each loop before the loop enters said inlet end, and means to remove lubricant from each loop at a location between said outlet end and the place of engagement of the loop by the drive roll, the last-named means comprising a first scraper arranged to scrape lubricant from its loop, an applicator for applying a diluent to the scraped surface of the loop and a second scraper arranged to scrape diluted lubricant from the loop surface.

4. In a machine for forming workpieces in sheet form, a frame, first and second shoes mounted on said frame in parallel spaced apart relation to define therebetween a passageway having inlet and outlet ends, said shoes facing each other and each having a first flat surface adjacent to said inlet end, a parallel second flat surface adjacent to said outlet end and a compression surface sloping inwardly from said first to said second surface, first and second endless loops of thin flexible sheet metal having a high tensile strength supported on said frame to move over the respective surfaces of said first and second shoes, drive roll means for driving each of said loops so that a workpiece can be drawn between said shoes by frictional engagement with the surfaces of said loops, the drive roll of each of said means drivingly engaging the same surface of its associated loop that bears against the surface of the associated shoe, means to lubricate the shoe bearing surface of each loop before the loop enters said inlet end, and means to remove lubricant from each loop at a location between said outlet end and the place of engagement of the loop by the drive roll, the last-named means comprising an applicator for applying a diluent to the surface of the loop and a scraper arranged to scrape diluted lubricant from the loop surface.

5. In a machine for forming workpieces in sheet form, first and second shoes having opposed surfaces in spaced apart relation, first and second endless loops of thin flexible sheet metal having a high tensile strength positioned to move over the respective surfaces of said first and second shoes, roll assemblies for each of said loops, each assembly including a drive roll engaging the shoe bearing surface of its loop and a pinch roll positioned so that the loop is wrapped partially therearound and the loop is pinched between the drive roll and the pinch roll, said roll assemblies being operable so that a workpiece can be drawn between said shoes by frictional engagement with the surfaces of said loops, means to lubricate the shoe bearing surface of each loop prior to moving the same over the shoe surface, and means to remove lubricant from each loop after the latter has moved past the shoe surface and prior to engagement of such loop by the drive roll, said last-named means including an applicator for applying a diluent and a scraper for removing diluted lubricant.

6. In a machine for forming workpieces in sheet form, first and second shoes having opposed surfaces in spaced apart relation, first and second endless loops of thin flexible sheet metal having a high tensile strength positioned to bear against and to move over the respective surfaces of said first and second shoes, roll assemblies for supporting and driving each of said loops, each assembly including a drive roll drivingly engaging the shoe bearing surface of its loop, drive means for turning the drive rolls of each assembly at equal rates of revolution so that a workpiece can be drawn by the pulling action of both loops between said shoes by frictional engagement of the workpiece with the surfaces of said loops, means to provide a lubricant between each shoe and the shoe bearing surface of its associated loop, and means to remove lubricant in controlled amounts from the shoe bearing surfaces of each of said loops so that optimum pulling of each loop is effected at each drive roll while limited slippage can occur between each loop and its associated roll assembly to distribute the pulling loads equally on both loops.

7. In a machine for forming workpieces in sheet form, first and second shoes having opposed surfaces in spaced apart relation, first and second endless loops of thin flexible sheet metal having a high tensile strength positioned to bear against and to move over the respective surfaces of said first and second shoes, roll assemblies for supporting and driving each of said loops, each assembly including a drive roll drivingly engaging the shoe bearing surface of its loop, drive means for turning the drive rolls of each assembly at equal rates of revolution so that a workpiece can be drawn by the pulling action of both loops between said shoes by frictional engagement of the workpiece with the surfaces of said loops, means to provide a lubricant between each shoe and the shoe bearing surface of its associated loop, and means to remove lubricant in controlled amounts from the shoe bearing surfaces of each of said loops so that optimum pulling of each loop is effected at each drive roll while limited slippage can occur between each loop and its associated roll assembly to distribute the pulling loads equally on both loops, said means to remove lubricant comprising a first scraper arranged to scrape lubricant from the bearing surface of its loop, an applicator for applying a diluent to the scraped surface and a second scraper arranged to scrape diluted lubricant from the bearing surface.

8. In a machine having at least one sheet metal belt, a bearing surface over which one surface of said belt is adapted to pass, and drive roll means located after said bearing surface for frictionally engaging said one surface of said belt for pulling said belt over said bearing surface, wherein the improvement comprises means after said bearing surface and before said drive roll means to remove lubricant from said belt including an applicator for applying a diluent to said surface of the belt and thereafter a scraper arranged to scrape diluted lubricant from said one surface.

9. In a machine having at least one sheet metal belt, a bearing surface over which one surface of said belt is adapted to pass, and drive roll means located after said bearing surface for frictionally engaging said one surface of said belt for pulling said belt over said bearing surface, wherein the improvement comprises means after said bearing surface and before said drive roll means to remove lubricant from said belt including a first scraper arranged to scrape lubricant from said one surface of the belt, an applicator for applying a diluent to the scraped surface and a second scraper arranged to scrape diluted lubricant from said one surface.

10. In a machine having at least one sheet metal belt, a bearing surface over which one surface of said belt is adapted to pass, and drive roll means located after said bearing surface for frictionally engaging said one surface of said belt for pulling said belt over said bearing surface, wherein the improvement comprises means in advance of said bearing surface for applying a lubricant on said one surface of the driven belt, and means after said bearing surface and before said drive roll means to remove lubricant from said belt including a first scraper arranged to scrape lubricant from said one surface of the belt, an applicator for applying a diluent to the scraped surface and a second scraper arranged to scrape diluted lubricant from said one surface.

References Cited

UNITED STATES PATENTS

| | | | |
|---|---|---|---|
| 2,981,307 | 4/1961 | Malarkey | 100—154 |
| 3,111,149 | 11/1963 | Schubert | 100—154 X |
| 3,159,526 | 12/1964 | Hartesveldt | 161—261 |
| 3,215,065 | 11/1965 | Malar Key | 100—154 X |

ROBERT W. JENKINS, *Primary Examiner.*